3 Sheets—Sheet 1.

T. S. BATES.

PLATE PRINTING PRESS.

No. 10,080. Reissued Apr. 11, 1882.

WITNESSES

W. J. Cambridge

Chas. E. Griffin

INVENTOR

Thomas S. Bates per P. C. Teschemacher

Atty

3 Sheets—Sheet 2.

T. S. BATES.

PLATE PRINTING PRESS.

No. 10,080. Reissued Apr. 11, 1882.

WITNESSES

W. J. Cambridge

Chas. E. Griffin

INVENTOR

Thomas S. Bates per F. Teschemacher

Atty

3 Sheets—Sheet 3.

T. S. BATES.

PLATE PRINTING PRESS.

No. 10,080. Reissued Apr. 11, 1882.

WITNESSES

W. J. Cambridge

Chas. E. Griffin

INVENTOR

Thomas S. Bates per P. E. Teschemacher

Atty

UNITED STATES PATENT OFFICE.

THOMAS S. BATES, OF BOSTON, MASSACHUSETTS.

PLATE-PRINTING PRESS.

SPECIFICATION forming part of Reissued Letters Patent No. 10,080, dated April 11, 1882.

Original No. 145,610, dated December 16, 1873; Reissue No. 5,879, dated May 19, 1874. Application for reissue filed June 10, 1881.

*To all whom it may concern:*

Be it known that I, THOMAS S. BATES, of Boston, in the county of Suffolk and State of Massachusetts, have invented certain Improvements in Plate-Printing Presses, of which the following is a full, clear, and exact description, reference being had to the accompanying drawings, making part of this specification, in which—

Figure 1:
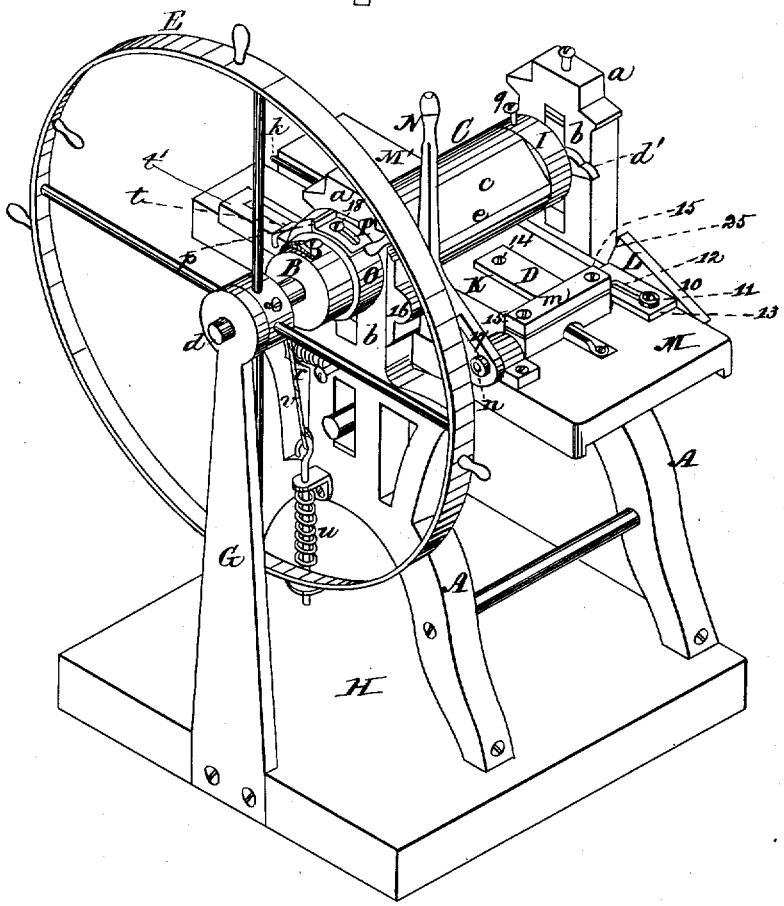
Figure 2:
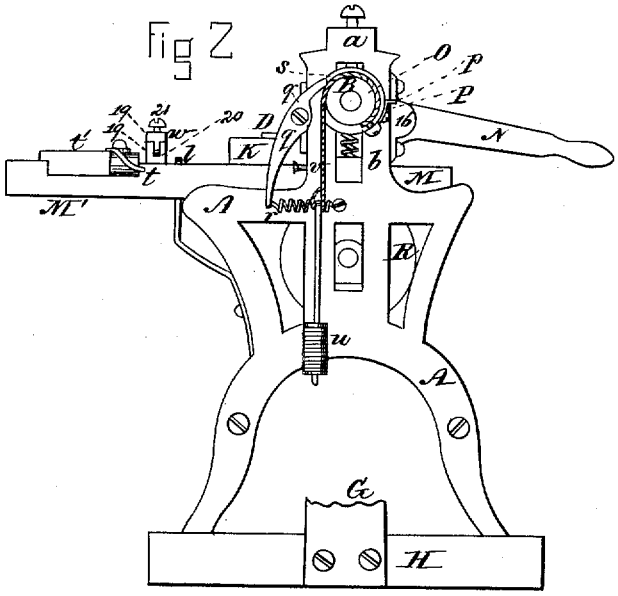
Figure 3:
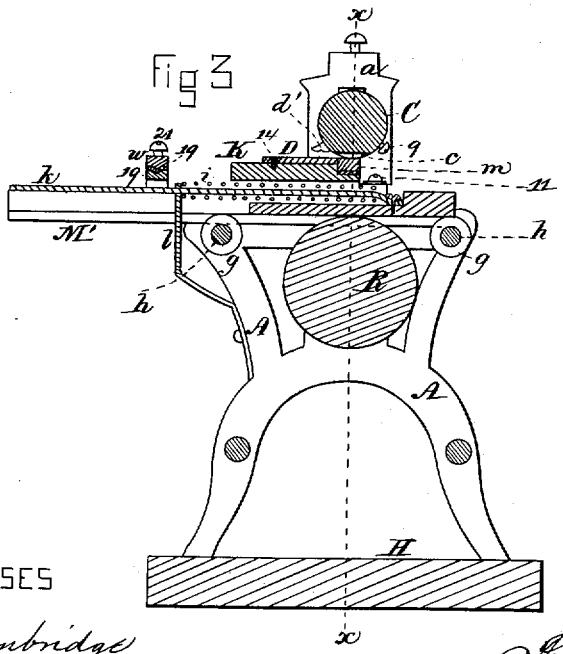
Figure 4:
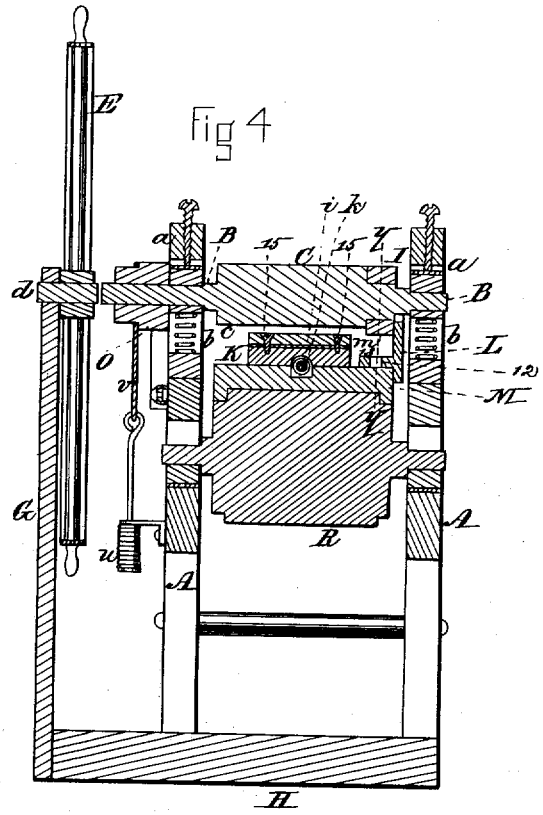
Figure 5:
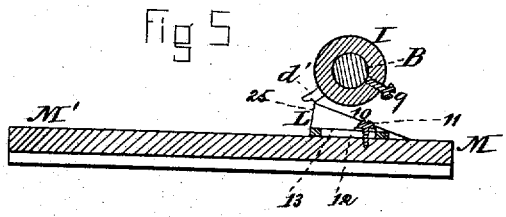

Figure 1 is a perspective view of a cylindrical plate-printing press with my improvements applied thereto. Fig. 2 is a side elevation of the same, the position of some of the parts being changed. Fig. 3 is a longitudinal vertical section through the center of the press, the position of the parts being the same as that represented in Fig. 2. Fig. 4 is a transverse vertical section on the line *x x* of Fig. 3. Fig. 5 is a vertical section on the line *y y* of Fig. 4.

To enable me to take impressions upon paper and to effect a saving in the time and labor required to print the same is the object of my invention, which consists in a combination of the several devices hereinafter described.

To enable others skilled in the art to understand and use my invention, I will proceed to describe the manner in which I have carried it out.

In the said drawings, A is the frame-work, in upright portions *a a* of which and on spring-bearings *b b*, placed therein, rest the ends of a horizontal shaft, B, to which is secured a cylinder, C, flattened at *c* in the form shown, in order that the pressure on the plate D may be discontinued when required to remove the impression.

To one end of the shaft B, outside the frame-work, is secured a fly-wheel, E, which may be disengaged therefrom, when desired, by throwing it laterally upon a short spindle, *d*, in line therewith, and projecting out from near the top of a standard, G, rising from the base H of the press. This fly-wheel is intended to be used where large plates are employed for printing large or commercial work. Surrounding the other end of the shaft, inside the upright portion *a*, is a collar, I, provided with a projection, *d'*. This collar I is made adjustable, so that its projection *d'* may be so set with respect to the edge *e* of the flattened portion *c* of the cylinder that when the circular portion of the cylinder impinges upon or takes hold of the plate the length of the remaining circular portion of the cylinder to be used, or that portion thereof between the point where it impinges on the edge of the plate and the edge *e* of the flattened portion *c*, will be equal to the length of the plate or portion thereof from which an impression is to be taken.

9 is a screw for securing the collar I in place when adjusted.

By this mode of construction I am enabled to commence and discontinue the pressure of the cylinder on the plate at any point required, thus saving much time and labor and securing more advantages in plate-printing than where the point of impingement is always at the commencement of the rounded portion of the cylinder, as in plate-printing presses of the old construction, in which that part not required to be used on the plate has to be turned on the front of the bed until the flattened portion comes around to relieve the table, in order to bring the plate back to the operator.

The projection *d'* of the collar I acts upon the inclined surface 10 of an adjustable wedge, L, secured in place upon the table M M' when adjusted by means of a screw, 11, passing through a slot, 12, formed in its lower flat portion, 13, the wedge L being moved to the back of the table when the press is to be operated by the wheel. The wedge L must be adjusted so that the projection *d'*, moving on its inclined portion, may leave its surface the instant that the rounded portion of the cylinder impinges on the edge of the plate, so that it may be free to act thereon. The table M M' is provided at its rear end with a stop or projection, *t'*, made adjustable thereon, and adapted to strike the frame-work of the press, whereby the movement of the table toward the operator is arrested at the desired point, and by adjusting the position of this stop *t'* relatively to that of the adjustable wedge L the point of the projection *d'* of the collar I is caused, when the movement of the table is arrested by the stop *t'*, to rest on the inclined surface of the wedge L in the exact position required to insure the proper movement of the table under the cylinder to take the impression. The projection *d'*, acting on the inclined surface 10 of the wedge L, moves it, together with the table M M', under the cylinder C. The projection $d'$, being pressed on the inclined surface 10 by the turning of the wheel, moves the said inclined surface under it. The cylinder in its revolution gives a positive motion to the table, thus securing a compound power, which moves the table a distance equal to the extent that the wedge travels by the downward pressure of the projection $d'$, in addition to the positive movement given by the revolution of the cylinder. The under side of the table M M′ is provided with two flanges extending down below it, which project over the outer faces of guide-wheels $g$, secured to rollers $h$ $h$, one at the front and one at the rear of the table M M′. After the entire length of the plate has passed under the cylinder the pressure is discontinued by the flattened portion $c$ coming around immediately over it, when the table, with the plate thereon, is instantly returned to the front of the machine by a spiral spring, $i$, surrounding a guide-rod, $k$, placed under the bed, the spring being compressed against a stop, $l$, by the advance movement of the sliding table, and being released the moment the cylinder ceases to act on the plate. The plate is secured firmly to the bed by a cleat, $m$, at its front end, made adjustable by screws 15, and provided with a beveled edge, under which the beveled edge of the front of the plate is fitted, by which construction the upper surfaces of the plate and the cleat $m$ are always flush with each other.

Where short plates are to be used for producing light work—such as cards, &c.—I prefer to move the table by operating a bent hand-lever, N, the lower end of which is provided with a slot, 17, for the reception of a projection, $n$, on the table. The portion of the lever where it is bent is pivoted to the frame-work at 16. By depressing the lever the table is made to move away from the operator, thus bringing the plate into contact with the cylinder to revolve it.

On the outside of the end of the shaft of the cylinder is fitted a collar, O, provided with a sliding slotted plate, P, secured to the collar O by means of a screw, 18, one end of the slotted plate being turned up so as to form a projection, $p$, which serves as a stop, the position of which relative to the edge $e$ of the flattened portion $c$ is carefully adjusted, so that the cylinder may only perform such portion of a revolution as may be necessary for the length of the plate in use, the heel 25 of the wedge L engaging with the projection $d'$ immediately after the rounded portion of the cylinder leaves the plate and the flattened portion $c$ is brought directly over it, when a pawl, $q$, kept in constant contact with the collar O by a spiral spring, $r$, drops into a notch, $s$, in the collar, and holds the cylinder in this position out of contact with the plate till the table, with the plate, is returned to its original position in front of the operator to enable him to remove the impression just taken, when the movement of the table brings the projection $t$ thereon against the lower end of the pawl, which compresses the spring $r$ and throws the upper end of the pawl $q$ out of the notch, when the cylinder is turned a partial revolution by the recoil of a spiral spring, $u$, connected by a cord, $v$, with the end of the cylinder, till the stop $p$ strikes against the pawl and prevents the further turning of the cylinder, the extent of the partial revolution being just sufficient to return the cylinder into the precise position it had before, being that ready for exerting pressure upon the plate as required.

The table is supported by a large roll, R, placed directly under the center of the cylinder C, where the pressure would be brought upon the plate.

$w$ is a clamp, composed of two jaws, 19 19, pivoted together at 20, for securely holding the strips of paper placed over the paper which receives the impression, a screw, 21, being provided for keeping the upper jaw down upon the strips, whereby the position of the "emboss" is not changed and correct impressions are insured.

When the machine is to be operated by the wheel the wedge is adjusted at the end of the table marked M′, so that the point of the projection $d'$ rests on the top of the incline 10. The wheel being put in motion, the pressure of the projection $d'$ on the incline forces the table under the cylinder till the latter engages with the plate on the bed and produces the impression, after which the table is returned by the spiral spring $i$.

When the cylinder is to be operated by the lever the wedge is adjusted as shown in Fig. 1, and on the completion of the impression its heel continues the revolution of the cylinder till the flat part thereof is parallel with the bed, when the pawl $q$ enters the notch $s$ in the collar O and holds the cylinder while the table is being returned by the spiral spring $i$, after which the projection $t$ releases the pawl, and the cylinder is revolved by the spring-rod $u$ and cord $v$ till the stop $p$ is brought into contact with the pawl $q$.

It will be seen from the foregoing that I am enabled to use a smaller cylinder and obtain an increase of power sufficient to obtain a succession of perfect impressions on dry paper, thereby dispensing with the employment of a separate press to return the paper, when dampened, to its original dry, smooth, and hard condition, rendered necessary by the ordinary construction of plate-printing presses, and I am also enabled to economize much time and labor in producing impressions of light work by the application of my invention thereto.

What I claim as my invention, and desire to secure by Letters Patent, is—

1. The D-shaped cylinder C, stop $s$, adjustable stop $p$, and projections $t$ and $d'$, in combination with the heel 25 of an adjustable wedge, L, table M M′, and lever N, the spring-pawl $q$ $r$ and spring-rod and cord $u$ $v$, substantially as and for the purpose set forth.

2. The D-shaped cylinder and projection $d'$, in combination with the inclined surface 10 of the adjustable wedge L and fly-wheel E, or a series of spokes or arms, as and for the purpose described.

3. In a plate-printing press, the D-shaped cylinder C, provided with a collar, I, having a projection, $d'$, and made adjustable in order to vary its relative position to the edge $e$ of the flattened portion $e$ of the cylinder, in combination with and adapted to be brought into contact with a projection on the table M M′ for the purpose of moving the latter under the cylinder C, substantially as and for the purpose set forth.

Witness my hand this 7th day of June, A. D. 1881.

THOS. S. BATES.

In presence of—
P. E. TESCHEMACHER,
W. J. CAMBRIDGE.